US007093966B2

(12) United States Patent
Yamamura et al.

(10) Patent No.: US 7,093,966 B2
(45) Date of Patent: Aug. 22, 2006

(54) VEHICLE HEADLAMP

(75) Inventors: Satoshi Yamamura, Shizuoka (JP); Masahito Naganawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 68 days.

(21) Appl. No.: 10/942,824

(22) Filed: Sep. 17, 2004

(65) Prior Publication Data

US 2005/0063193 A1 Mar. 24, 2005

(30) Foreign Application Priority Data

Sep. 24, 2003 (JP) ......................... P. 2003-331904

(51) Int. Cl.
*B60Q 1/04* (2006.01)
*B60Q 1/02* (2006.01)

(52) U.S. Cl. ....................... 362/539; 362/459; 362/538

(58) Field of Classification Search ................. 362/539
See application file for complete search history.

(56) References Cited

U.S. PATENT DOCUMENTS 6,796,696 B1 * 9/2004 Taniuchi ..................... 362/539

FOREIGN PATENT DOCUMENTS

JP 02-047704 U 4/1990

* cited by examiner

*Primary Examiner*—Renee Luebke
*Assistant Examiner*—Leah S. Lovell
(74) *Attorney, Agent, or Firm*—Sughrue Mion, PLLC

(57) ABSTRACT

A first additional reflector 34 is provided between a light source bulb 22 and a shade 32 and used for reflecting light from a light source 22*a* to an area in front in the direction of inserting the bulb on the reflective surface 24*a* of a reflector 24. Further, the area in front in the direction of inserting the bulb on the reflective surface 24*a* of the reflector 24 is formed as a second additional reflector 36 for reflecting the light reflected from the first additional reflector 34 forward and closer to an optical axis Ax. Thus, direct light from the light source 22*a* which is to be shielded by the shade 32 is caused to be incident on a projection lens 28 by using the first and second additional reflectors 34 and 36, whereby the direct light can effectively be utilized as forward irradiation light.

6 Claims, 8 Drawing Sheets

VEHICLE HEADLAMP

The present application claims foreign priority based on Japanese Patent Application Nos. P.2003-331904, filed Sep. 24, 2003, the contents of which are incorporated herein by reference.

BACKGROUND OF THE INVENTION

The present invention relates to a so-called projector type vehicle headlamp, and more particularly, the invention relates to a vehicle headlamp so configured as to form a low-beam luminous distribution pattern.

A projector type vehicle headlamp is normally equipped with a projection lens arranged on an optical axis extending in the longitudinal direction of a vehicle and a light source disposed behind the rear-side focal point, so that light from the light source is reflected by a reflector toward the optical axis.

In JP-U-02-047704, a so-called side-inserted type lighting device is described with reference to a projector type vehicle headlamp of the sort mentioned above, the lighting device being configured such that a light source bulb is fixedly inserted into a reflector from the lateral side of an optical axis.

The adoption of such a side-inserted type lighting device as described in JP-U-02-047704 makes it possible to render the lighting device compact by decreasing its longitudinal length.

However, as described in JP-U-02-047704, since many light source bulbs are formed to have line light sources extended in the axial direction of the bulbs, the following problems develop when the side-inserted type lighting device is employed.

More specifically, the light distribution of the line light source has such luminous intensity distribution that the luminous intensity is greatest in a direction perpendicular to the axis of the bulb and it is lowest in the axial direction of the bulb. Consequently, when the side-inserted type lighting device is employed, the problem is that as the quantity of light incident on an area in the forward direction in which the bulb is inserted on the reflective surface of the reflector becomes extremely small, it is difficult to secure sufficient brightness of the luminous distribution pattern formed by the light irradiated from the vehicle headlamp.

When the low-beam luminous distribution pattern is formed in particular, another problem is that as a predetermined cutoff line is formed by shading part of the light reflected from the reflector with a shade disposed in the vicinity of the rear-side focal point of a projection lens, formation of a bright luminous distribution pattern tends to become more difficult.

SUMMARY OF THE INVENTION

An object of the invention made in view of the situation above is to provide a vehicle headlamp capable of forming a sufficiently bright luminous distribution pattern even when a side-inserted type lighting device is employed for a projector type vehicle head lamp so configured as to form a low-beam luminous distribution pattern.

In order to accomplish the object above, additional reflectors are provided as prescribed according to the invention.

A vehicle headlamp according to the invention comprising: a projection lens disposed on an optical axis extending in the longitudinal direction of a vehicle; a light source disposed on the rear side behind the rear-side focal point of the projection lens; a reflector for reflecting light from the light source forward and closer to the optical axis; and a shade disposed so that the upper end edge is positioned close to the optical axis in the vicinity of the rear-side focal point and used for shielding part of the light reflected from the reflector, and in the vehicle headlamp, the light source is formed as a line light source extending in the axial direction of a light source bulb fixedly inserted into the reflector from the lateral side of the optical axis; a first additional reflector provided between the light source bulb and the shade and used for reflecting light from the light source to an area in front in the direction of inserting the bulb on the reflective surface of the reflector; and the area in front in the direction of inserting the bulb is formed as a second additional reflector for reflecting the light reflected from the first additional reflector forward and closer to the optical axis.

The 'light source bulb' above is not specifically restricted in kind but can be a discharge bulb, a halogen bulb or the like for adoption.

The 'area in front in the direction of inserting the bulb' means a reflective area positioned forward in the direction of inserting the light source bulb on the reflective surface of the reflector and a definite range of areas is not specifically restricted.

The first additional reflector is a reflector provided between the light source bulb and the shade and as long as it is used for reflecting light from the light source toward the area in front in the direction of inserting the bulb, its concrete formation including location, size, reflective surface configuration and so on is not specifically restricted.

As long as the 'second additional reflector' is formed so as to reflect the light reflected from the first additional reflector forward and closer to the optical axis in the area in front in the direction of inserting the bulb, its concrete formation including size, reflective surface configuration and soon is not specifically restricted. Moreover, the 'second additional reflector' may be formed integrally with the reflector or separately from the reflector.

As indicated by the formation above, the vehicle headlamp according to the invention is formed as a projector type vehicle headlamp having the shade. However, it is feasible to make the vehicle headlamp compact by decreasing the longitudinal length of the lighting device since the light source bulb is inserted into the reflector from the lateral side of the optical axis extended in the longitudinal direction of the vehicle.

Further, the vehicle headlamp according to the invention is provided with the first additional reflector between the light source bulb and the shade, which reflector is used for reflecting light from the light source toward the area in front in the direction of inserting the bulb on the reflective surface of the reflector. Moreover, the area in front in the direction of inserting the bulb on the reflective surface of the reflector is formed as the second additional reflector for reflecting the light reflected from the first additional reflector forward and closer to the optical axis and direct light from the light source which is to be shielded by the shade is caused to be incident on the projection lens by using the first and second additional reflectors, whereby the direct light can effectively be utilized as forward irradiation light.

In the vehicle headlamp according to the invention, a bundle of rays having the greatest luminous intensity in a direction perpendicular to the axis of the bulb can be utilized by the first and second additional reflectors since the light source is formed as the line light source extending in the axial direction of the bulb. Although direct light incident on the area in front in the direction of inserting the bulb from the light source is made unutilizable by forming the area in front in the direction of inserting the bulb on the reflective surface of the reflector as the second additional reflector, the bundle of utilizable rays as a whole can be increased drastically because the direct light is a bundle of rays having the lowest luminous intensity directed to the axis of the bulb. It is thus possible to secure sufficient brightness of the low-beam luminous distribution pattern formed by the irradiation light from the vehicle headlamp.

In addition, since the first additional reflector is provided between the light source bulb and the shade, the light reflected from the reflector is prevented from being shielded excessively by providing the first additional reflector.

In the projector type vehicle headlamp so configured as to form the low-beam luminous distribution pattern according to the invention, a sufficiently bright luminous distribution pattern can be formed even when the side-inserted type lighting device is employed.

With the arrangement above, as long as the light source bulb is fixedly inserted into the reflector from the lateral side of the optical axis, the position where the light source bulb is fixedly inserted is not specifically restricted. However, the following working-effect is achievable provided that the light source bulb is fixedly inserted into the reflector in a lower position separated from the optical axis.

More specifically, in the projector type vehicle headlamp, though an area on the lateral side of the optical axis on the reflective surface of the reflector is fit for forming the diffusion area of the luminous distribution pattern, the bulb inserting hole of the light source bulb is formed in the area on the lateral side of the optical axis in case that the light source bulb is fixedly inserted into the reflector on the same horizontal plane as that of the optical axis, whereupon the area on the lateral side of the optical axis is not effectively utilizable for controlling light distribution; whereby sufficient brightness of the diffusion area of the luminous distribution pattern is hardly secured. In this respect, the area on the lateral side of the optical axis is effectively utilizable for controlling light distribution on condition that the light source bulb is fixedly inserted into the reflector in a lower position separated from the optical axis, and the diffusion area of the luminous distribution pattern becomes formable by the light reflected from the area on the lateral side of the optical axis, so that sufficient brightness can be secured for the diffusion area.

With the arrangement above, the configuration of the reflective surface of the first additional reflector is set to a ellipsoidal shape so that the position of the light source is made a first focal point and that a predetermined position between the first additional reflector and the second additional reflector is made a second focal point, whereby the configuration of the reflective surface of the second additional reflector can be set on the assumption that an imaginary light source exists at the second focal point and the control of light distribution can be facilitated accordingly.

With the arrangement above, further, the configuration of the reflective surface of the second additional reflector is set to reflect the light reflected from the first additional reflector as the light converged substantially in the vicinity of the upper end edge of the shade with respect to the vertical direction and set to have a curved surface for reflecting the light reflected therefrom as substantially parallel light with respect to the horizontal direction. Thus, the additional luminous distribution pattern formed by the first and second additional reflectors can be reduced to a long luminous distribution pattern from side to side fit for irradiating the road surface ahead of the vehicle.

DESCRIPTION OF THE PREFERRED EMBODIMENT

An embodiment of the invention will now be described by reference to the drawings.

Figure 1:
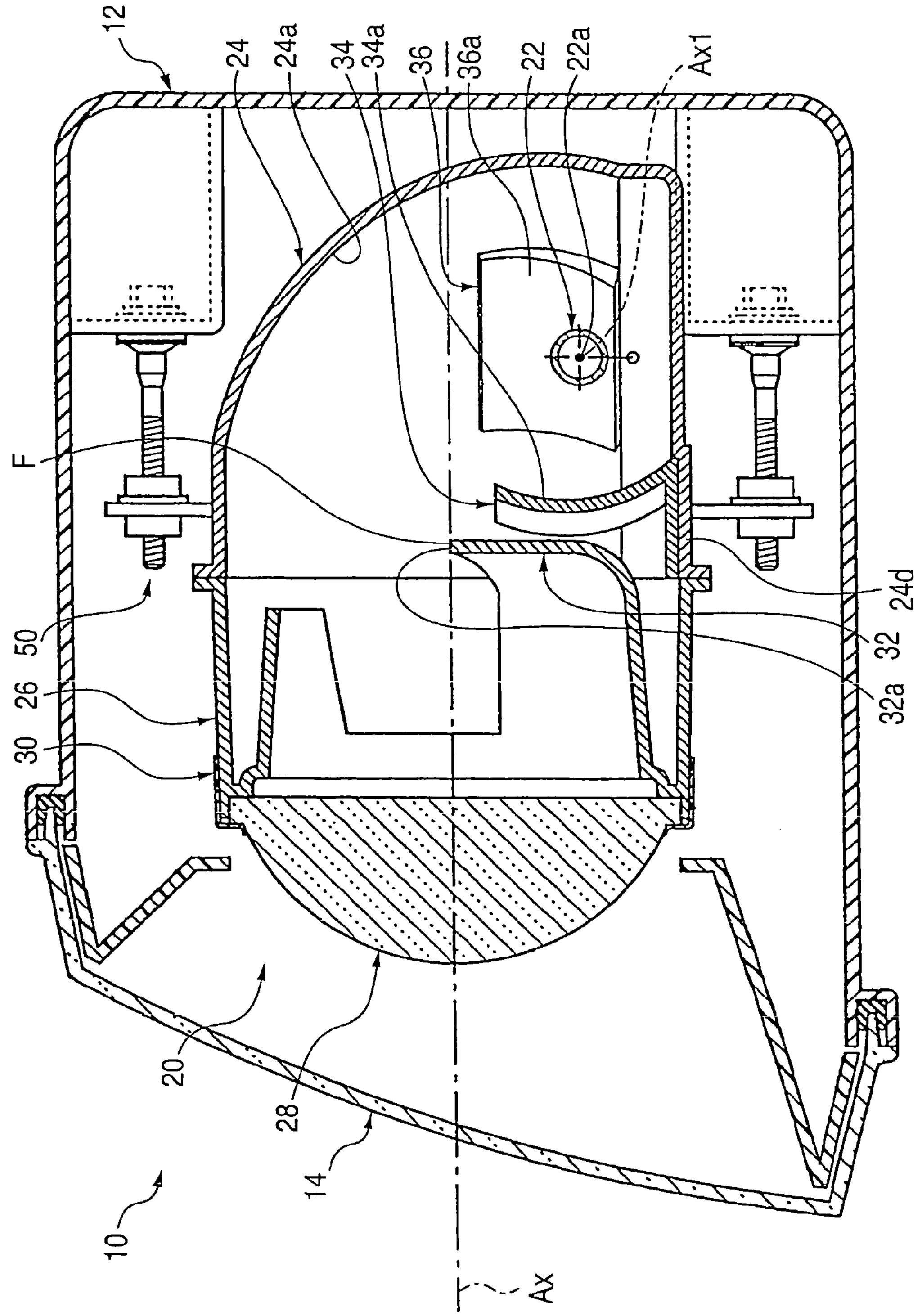
FIG. 1 is a sectional side view of a vehicle headlamp embodying the invention.

FIG. 1 is a sectional side view of a vehicle headlamp embodying the invention.

As shown in FIG. 1, a vehicle headlamp 10 embodying the invention is disposed in the right front end portion of a vehicle. A lighting device unit 20 having an optical axis Ax extending in the longitudinal direction of the vehicle is housed in a lamp chamber. The lamp chamber includes a lamp body 12 and a transparent light-permeable cover 14 mounted to a front end opening of the lamp chamber. The lighting device unit 20 is tiltable in vertical and horizontal directions via an aiming mechanism 50.

Upon completion of aiming adjustment made by the aiming mechanism 50, the optical axis Ax of the lighting device unit 20 is extended downward by approximately 0.5–0.6° with respect to the longitudinal direction of the vehicle.

Figure 2:
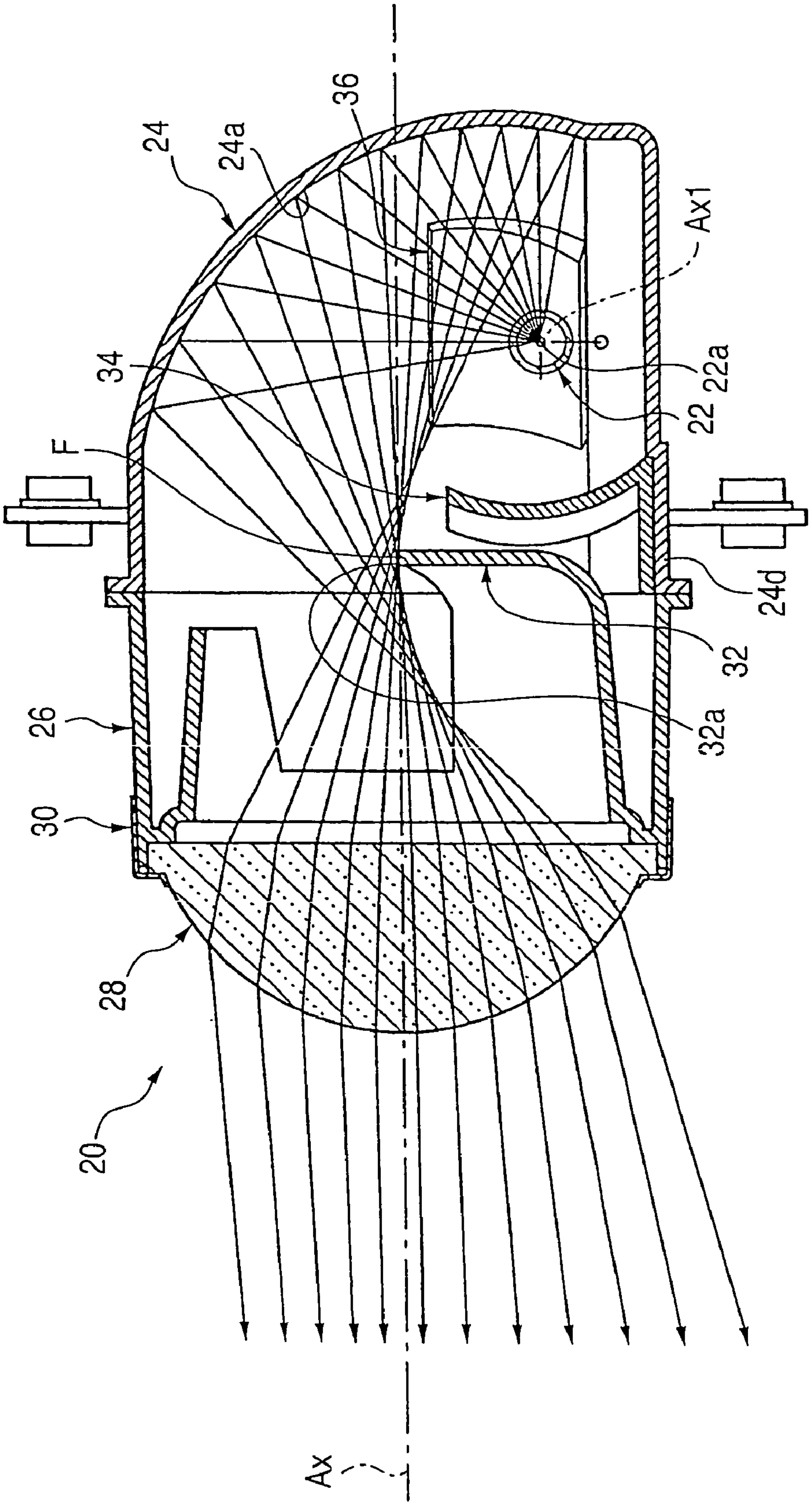
FIG. 2 is a sectional side view of a single lighting device unit for the vehicle headlamp, showing optical paths of light reflected from a reflector.
Figure 3:
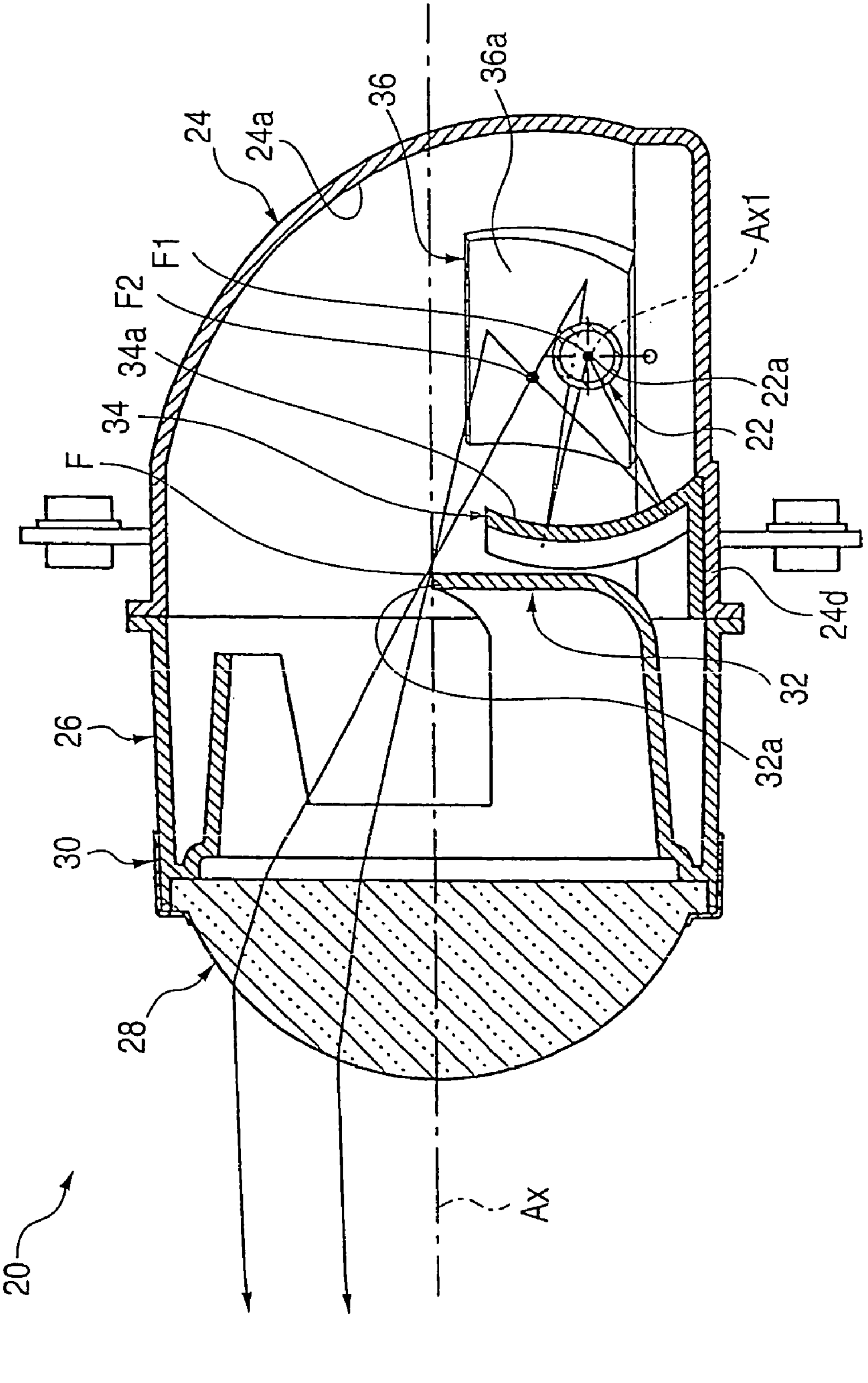
FIG. 3 is a sectional side view of the single lighting device unit, showing optical paths of light reflected from a first and a second additional reflector.
Figure 4:
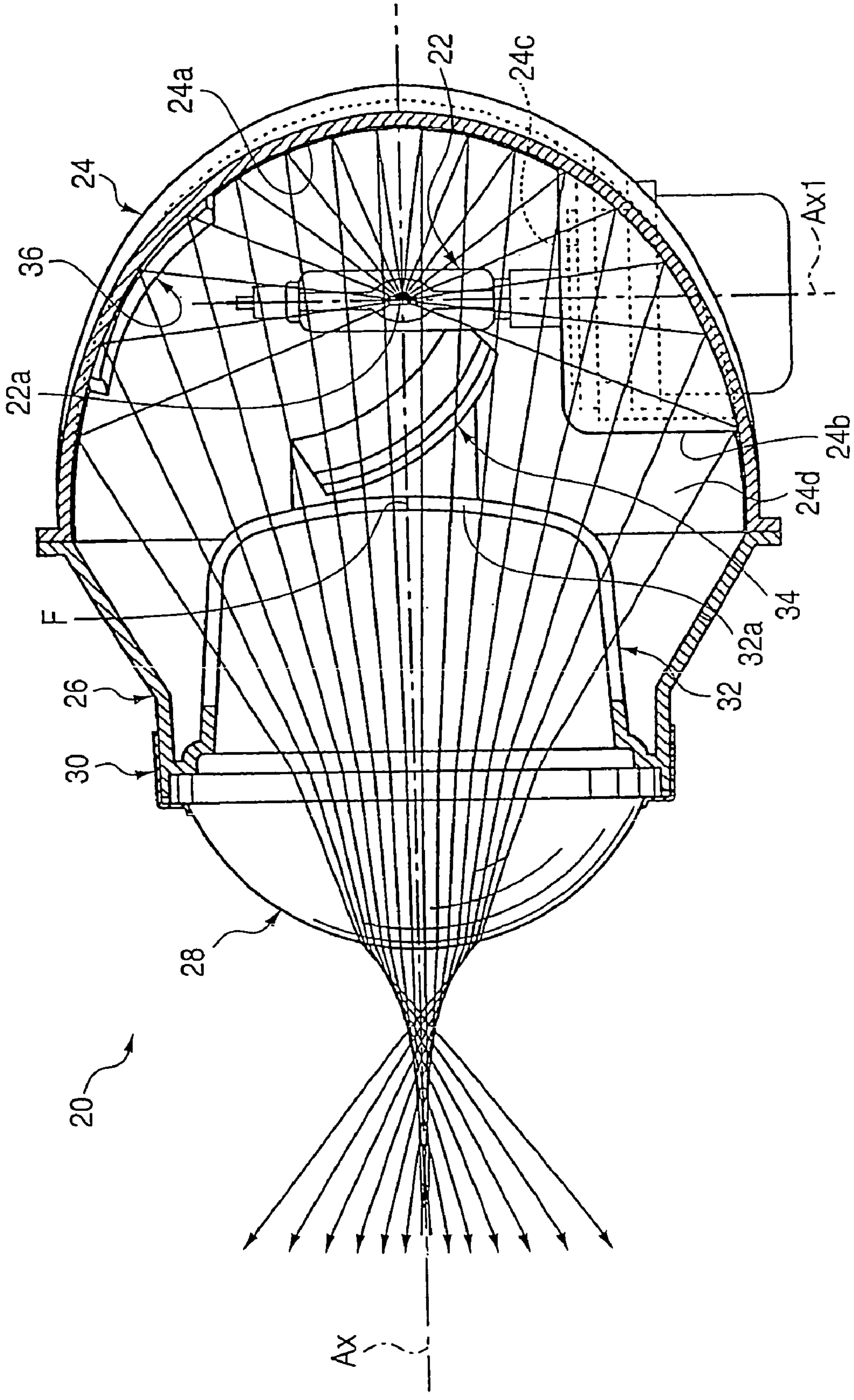
FIG. 4 is a horizontal sectional view of the single lighting device unit, showing optical paths of light reflected from the reflector.
Figure 5:
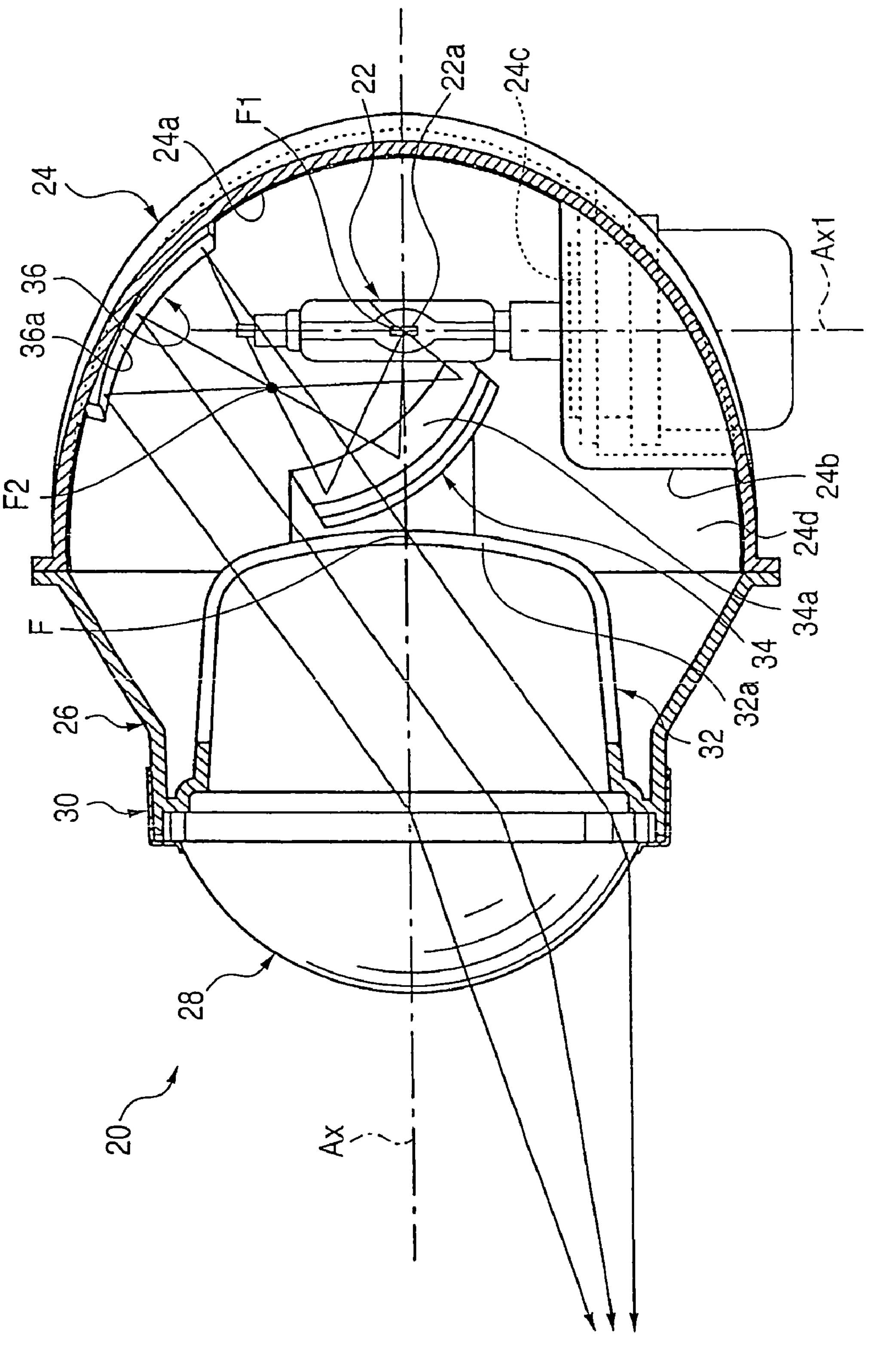
FIG. 5 is a horizontal sectional view of the single lighting device unit, showing optical paths of light reflected from the first and the second additional reflectors.

FIGS. 2 and 3 are sectional side views of the single lighting device unit 20 and FIGS. 4 and 5 are horizontal sectional views of the single lighting device unit 20 as well.

As shown in these figures, the lighting device unit 20 is a projector type lighting device unit including a light source bulb 22, a reflector 24, a holder 26, a projection lens 28, a retaining ring 30, a shade 32, a first additional reflector 34 and a second additional reflector 36.

The projection lens 28 is a plano-convex lens having a convex surface on the front side and a flat surface on the rear side and disposed on the optical axis Ax. The projection lens 28 is used for projecting an image on the focal plane forward as an inverted image, the focal plane including a rear-side focal point F.

The light source bulb 22 is a discharge bulb such as a metal halide bulb with the discharge light emitting portion as a light source 22*a,* which is formed as a line light source extending in the direction of the axis Ax1 of the bulb. Further, the light source bulb 22 is inserted into the reflector

24 from the left side of the optical axis Ax and fixed to the reflector 24, in such a position as is on the rear side behind the rear-side focal point F of the projection lens 28. In other words, the light source bulb 22 is fixedly inserted into the reflector 24 such that the axis Ax1 of the bulb is horizontally extended within a vertical plane meeting the optical axis Ax at right angles in order to position the light source 22*a* vertically below the optical axis Ax.

The reflector 24 has a reflective surface 24*a* for causing light from the light source bulb 22 to be reflected forward and closer to the optical axis Ax. The reflective surface 24*a* is set substantially elliptical in cross section including the optical axis Ax and its eccentricity is also set to grow gradually greater from the vertical cross section to the horizontal cross section. Thus, as shown in FIGS. 2 and 4, light from the light source 22*a* is reflected from the reflective surface 24*a* and then converged at a position near the rear-side focal point F within the vertical cross section, the converging position being moved forward quite a bit within the horizontal cross section.

A bulb inserting-fixing portion 24*b* is formed so as to protrude from the reflective surface 24*a* in the left-side area of the lower portion of the reflective surface 24*a* of the reflector 24. A bulb inserting hole 24*c* is formed in the right side portion of the bulb inserting-fixing portion 24*b*.

The holder 26 is formed so as to extend in a substantially cylindrical form forward from the front end opening of the reflector 24 and used to fixedly support the reflector 24 in its rear end portion and simultaneously used to fixedly support the projection lens 28 via the retaining ring 30.

The shade 32 is formed integrally with the holder 26 so that it is positioned in a substantially lower half portion in the inner space of the holder 26. The upper end edge 32*a* of the shade 32 is formed such that it is passed through the rear-side focal point F of the projection lens 28 and the light reflected from the reflective surface 24*a* of the reflector 24 is partially shielded whereby to remove most of the turned-up light (an upward light) emitted from the projection lens 28.

The first additional reflector 34 is provided between the light source bulb 22 and the shade 32 and fixed to the basewall 24*d* of the reflector 24. The first additional reflector 34 is formed so as to reflect direct light from the light source 22*a* to an area in front in the direction of inserting the bulb on the reflective surface 24*a* of the reflector 24. The area in front in the direction of inserting the bulb on the reflective surface 24*a* is formed as a second additional reflector 36 for reflecting the light reflected from the first additional reflector 34 forward and closer to the optical axis Ax.

The configuration of the reflective surface 34*a* of the first additional reflector 34 is set in an ellipsoidal shape so that the central position of the light source 22*a* is made a first focal point F1 and that a predetermined position between the first additional reflector 34 and the second additional reflector 36 is made a second focal point F2.

On the other hand, the configuration of the reflective surface 36*a* of the second additional reflector 36 is set to reflect the light reflected from the first additional reflector 34 as the light converged substantially in the vicinity of the upper end edge 32*a* of the shade 32 with respect to the vertical direction and set to have a curved surface for reflecting the light reflected therefrom as substantially parallel light with respect to the horizontal direction. More specifically, the vertical sectional shape of the reflective surface 36*a* is set elliptical with the second focal point F2 (of the first additional reflector 34) as the first focal point (of the second additional reflector 36) and with the vicinity of the upper edge 32*a* of the shade 32 as the second focal point (of the second additional reflector 36). Further, the horizontal sectional shape of the second additional reflector 36 is set parabolic with the second focal point F2 (of the first additional reflector 34) as a focal point (of the second additional reflector 36).

Figure 6:
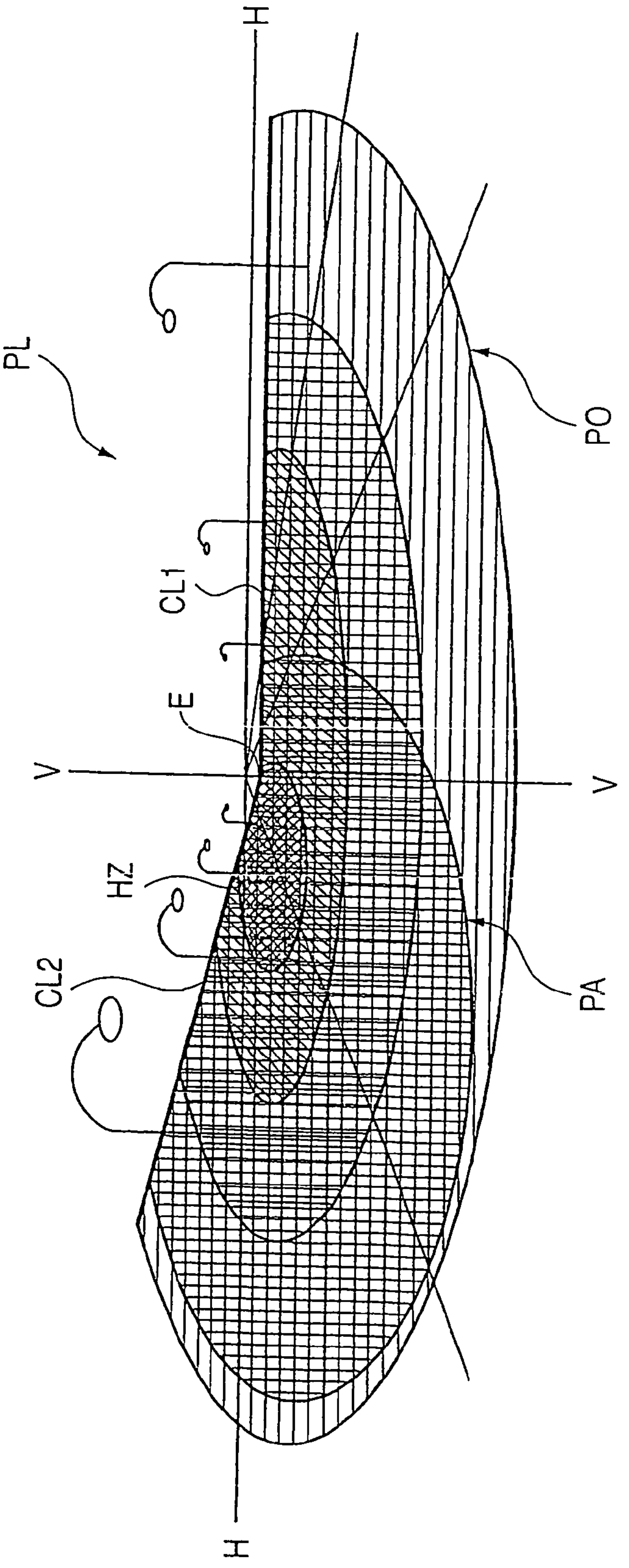
FIG. 6 is a perspective projection of a luminous distribution pattern formed by the light emitted forward from the vehicle headlamp on an imaginary vertical screen arranged in a position 25 m. ahead of a lighting device.

FIG. 6 is a perspective projection of a luminous distribution pattern formed by the light emitted forward from the vehicle headlamp 10 on an imaginary vertical screen arranged in a position 25 m. ahead of the lighting device.

As shown in FIG. 6, the luminous distribution pattern is a low-beam luminous distribution pattern PL of leftward light distribution and has a horizontal cutoff line CL1 on its upper end edge and an oblique cutoff line CL2 rising by a predetermined angle (e.g., about 150°) from the horizontal cutoff line CL1. An elbow point E as an intersection point between both cutoff lines CL1 and CL2 is set at a lower position by approximately 0.5–0.6° of H-V as a vanishing point when seen from the frontal direction of the lighting device. In the low-beam luminous distribution pattern PL, a hot zone HZ as a high luminous intensity area is formed so as to surround the elbow point E in a left-leaning direction.

The low-beam luminous distribution pattern PL is formed as a composite luminous distribution pattern with a basic luminous distribution pattern PO and an additional luminous distribution pattern PA.

The basic luminous distribution pattern PO is a luminous distribution pattern forming the basic configuration of the low-beam luminous distribution pattern PL and formed by the light reflected from the reflector 24. In the basic luminous distribution pattern, a curve indicating the contour and a plurality of curves formed substantially concentrically are equiluminous curves and indicate that the basic luminous distribution pattern PO becomes gradually brighter from its outer peripheral edge toward the hot zone HZ.

On the other hand, the additional luminous distribution pattern PA is aluminous distribution pattern formed additionally to reinforce a diffusion area on the left side of the basic luminous distribution pattern PO and formed by the light reflected from the first and second additional reflectors 34 and 36. As the additional luminous distribution pattern PA is formed from the light reflected twice, it becomes a relatively large luminous distribution pattern with a blurred contour. Consequently, it is possible to uniformly and broadly irradiate a left-leaning area of the road surface ahead of the vehicle by adding the additional luminous distribution pattern PA.

The horizontal and oblique cutoff lines CL1 and CL2 of the low-beam luminous distribution pattern PL are formed as inverted projection images on the upper end edge 32*a* of the shade 32. At this time, the upper end portion of any of the basic luminous distribution pattern PO and the additional luminous distribution pattern PA is in a cutoff form along the horizontal or oblique cutoff line CL1 or CL2.

As described in detail above, though the vehicle headlamp 10 embodying the invention is configured as a projector type vehicle headlamp having the shade 32, the light source bulb 22 is fixedly inserted into the reflector 24 from the lateral side of the optical axis Ax extending in the longitudinal direction of the vehicle, so that the lighting device can be made compact by decreasing its longitudinal length.

Further, the vehicle headlamp 10 embodying the invention is provided with the first additional reflector 34 disposed between the light source bulb 22 and the shade 32 and used for reflecting light from the light source 22*a* to the area in front in the direction of inserting the bulb on the reflective surface 24*a* of the reflector 24 and as the area in front in the direction of inserting the bulb is formed as the second additional reflector 36 for reflecting the light reflected from the first additional reflector 34 toward the optical axis Ax, direct light from the light source 22*a*, which is to be shielded by the shade 32, is caused to be incident on the projection lens 28 by using the first and second additional reflectors 34 and 36, whereby the direct light can effectively be utilized as forward irradiation light.

In the vehicle headlamp 10 embodying the invention, moreover, a bundle of rays having the greatest luminous intensity in a direction perpendicular to the axis of the bulb can be utilized by the first and second additional reflectors 34 and 36 since the light source 22*a* is formed as the line light source extending in the direction of the axis Ax1 of the bulb. Although direct light incident on the area in front in the direction of inserting the bulb from the light source 22*a* is made unutilizable by forming the area in front in the direction of inserting the bulb on the reflective surface 24*a* of the reflector 24 as the second additional reflector 36 according to the embodiment of the invention, the bundle of utilizable rays as a whole can be increased drastically because the direct light is a bundle of rays having the lowest luminous intensity directed to the axis of the bulb. It is thus possible to secure sufficient brightness of the low-beam luminous distribution pattern PL formed by the irradiation light from the vehicle headlamp 10.

Since the first additional reflector 34 is provided between the light source bulb 22 and the shade 32, the light reflected from the reflector 24 is prevented from being shielded excessively by providing the first additional reflector 34.

Thus, a sufficiently bright luminous distribution pattern can be formed even when the side-inserted type lighting device is employed according to the embodiment of the invention.

According to the embodiment of the invention, further, the formation of the bulb inserting hole 24*c* in the side area of the optical axis in the reflective surface 24*a* of the reflector 24 is avoided as the light source bulb 22 is fixedly inserted into the reflector 24 in a lower position separated from the optical axis Ax, whereby the side area of the optical axis is effectively utilizable as what controls the light distribution. Then the light reflected from the side area of the optical axis is usable for sufficiently securing the brightness of the diffusion area of the low-beam luminous distribution pattern PL.

According to the embodiment of the invention, the configuration of the reflective surface of the first additional reflector 34 is set in the ellipsoidal shape such that the central position of the light source 22*a* is made the first focal point F1 and that the predetermined position between the first additional reflector 34 and the second additional reflector 36 is made the second focal point F2. Therefore, the configuration of the reflective surface of the second additional reflector 36 can be set on the assumption that an imaginary light source exists at the second focal point F2, so that the light distribution control can be facilitated.

According to the embodiment of the invention, further, since the configuration of the reflective surface of the second additional reflector 36 is set to reflect the light reflected from the first additional reflector 34 as the light converged substantially in the vicinity of the upper end edge 32*a* of the shade 32 with respect to the vertical direction and set to have a curved surface for reflecting the light reflected from the first addition reflector 34 as substantially parallel light with respect to the horizontal direction, the additional luminous distribution pattern PA formed by the first and second additional reflectors 34 and 36 can be reduced to a long luminous distribution pattern from side to side fit for irradiating the road surface ahead of the vehicle.

Figure 7:
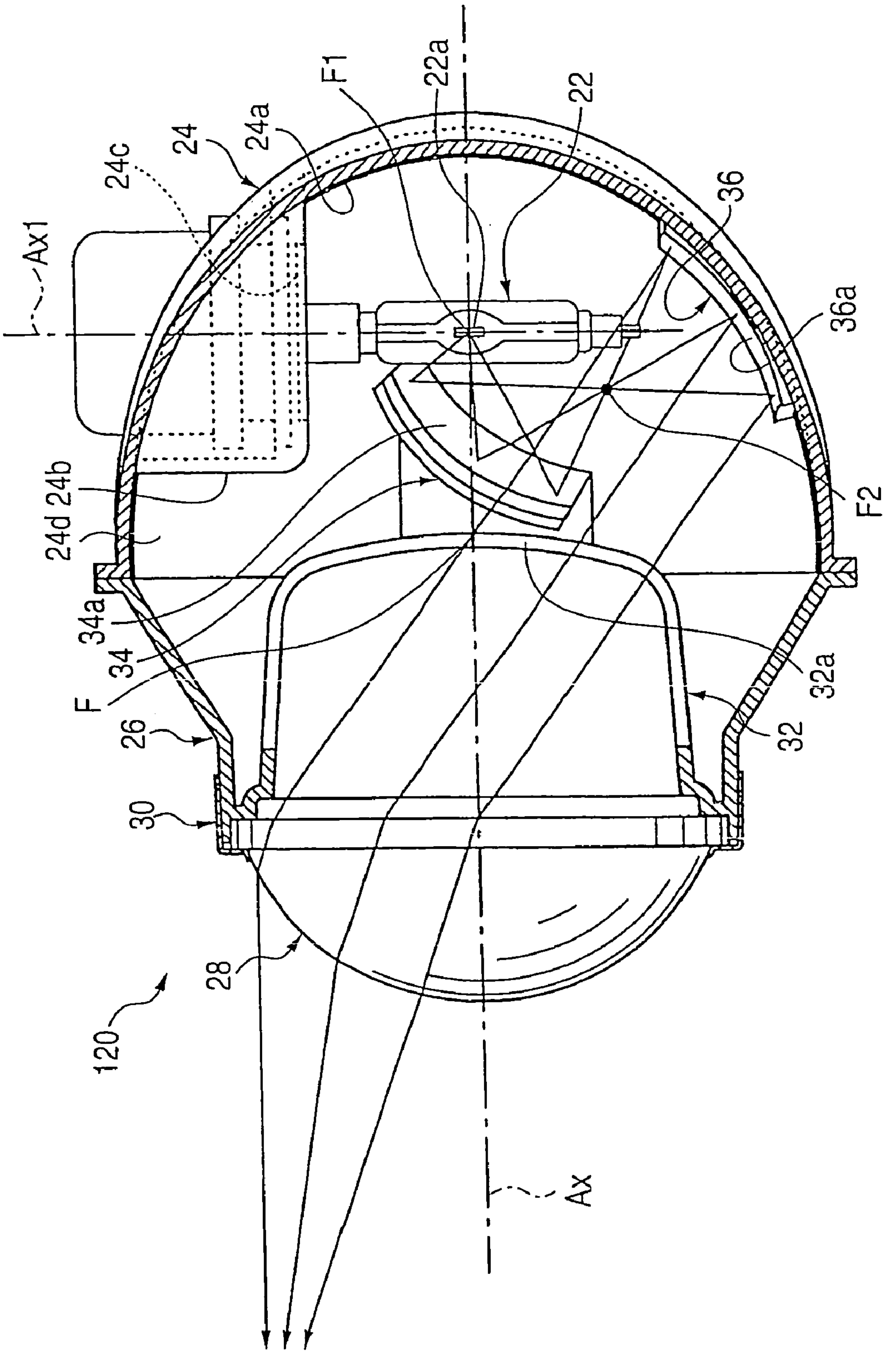
FIG. 7 is a horizontal sectional view of a modified example of the above embodiment of the invention, which sectional view is similar to FIG. 5.
Figure 8:
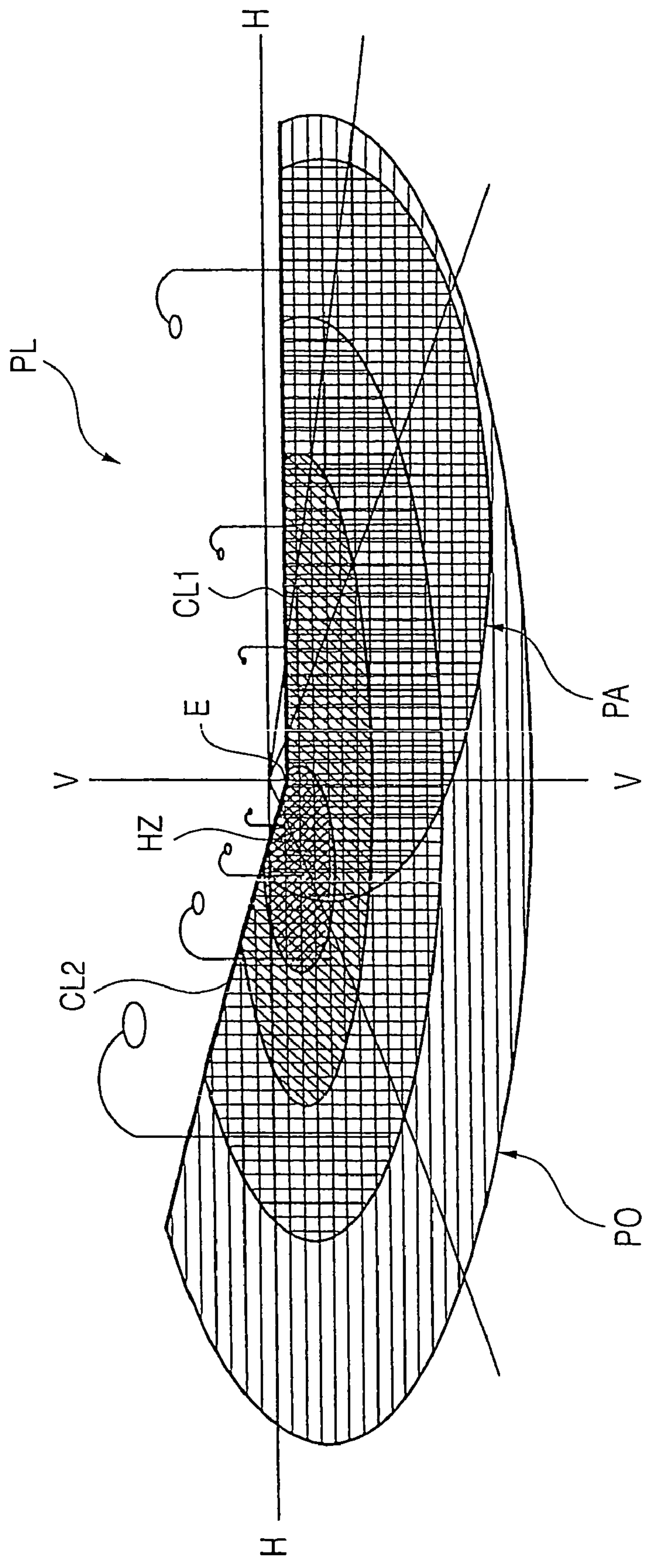
FIG. 8 is a perspective projection of a modified example of the luminous distribution pattern, which perspective projection is similar to FIG. 6.

Incidentally, though the diffusion area on the left side of the basic luminous distribution pattern PO is to be reinforced by the additional luminous distribution pattern PA according to the embodiment of the invention, the adoption of such a lighting device unit 120 in place of the lighting device unit 20 that the direction of inserting the bulb is reversed from left to right as shown in FIG. 7 makes it feasible to reinforce the diffusion area on the right side of the basic luminous distribution pattern PO by the additional luminous distribution pattern PA as shown in FIG. 8. In other words, the optical paths of the light reflected from the first and second additional reflectors 34 and 36 are made bilaterally symmetric by reversing the direction of inserting the bulb from left to right because the additional luminous distribution pattern PA is formed in a bilaterally symmetric position.

With respect to the vehicle headlamp disposed in the left front end portion of the vehicle with the lighting device unit 120 as shown in FIG. 7, the low-beam luminous distribution pattern PL of FIG. 6 and the low-beam luminous distribution pattern PL of FIG. 8 are made formable by simultaneously lighting a lateral pair of vehicle headlamps, so that the road surface ahead of the vehicle can broadly be irradiated by a lateral pair of additional luminous distribution patterns PA.

Although a description has been given of the light source bulb 22 inserted into the reflector 24 from the right lateral direction according to the embodiment of the invention, substantially the same working-effect as in the above embodiment thereof is achievable even though the insertion angle is slightly deviated from the right lateral direction on condition that the deviation there from in the vertical and horizontal directions is within roughly 30°.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle headlamp comprising:

a projection lens disposed on an optical axis extending in the longitudinal direction of a vehicle;

a light source disposed on the rear side behind the rear-side focal point of the projection lens, and formed as a line light source extending in an axial direction of a light source bulb;

a reflector for reflecting light from the light source forward and closer to the optical axis, wherein the light source is fixedly inserted into the reflector from the lateral side of the optical axis;

a shade, disposed so that the upper end edge of the shade is positioned close to the optical axis in the vicinity of the rear-side focal point, for partially shielding the light reflected from the reflector;

a first additional reflector, disposed between the light source bulb and the shade, for reflecting light from the light source to an area in front in the direction of inserting the light source bulb on the reflective surface of the reflector; and a second additional reflector, formed on the area in front in the direction of inserting the light source bulb, for reflecting the light reflected from the first additional reflector forward and closer to the optical axis;

wherein the light source bulb is fixedly inserted into the reflector in a lower position separated from the optical axis.

2. The vehicle headlamp according to claim 1, wherein the configuration of the reflective surface of the second additional reflector is a curved surface for reflecting the light reflected from the first additional reflector as the light converged substantially in the vicinity of the upper end edge of the shade with respect to the vertical direction and for reflecting the light reflected from the first additional reflector as substantially parallel light with respect to the horizontal direction.

3. The vehicle headlamp according to claim 1, wherein a reflective surface of the second additional reflector has a vertical section in an ellipsoidal shape, and a horizontal section in paraboloidal shape.

4. The vehicle headlamp according to claim 1, wherein the second additional reflector is formed integrally with the reflector.

5. The vehicle headlamp according to claim 1, wherein the second additional reflector is formed separately from the reflector.

6. A vehicle headlamp comprising:

a projection lens disposed on an optical axis extending in the longitudinal direction of a vehicle;

a light source disposed on the rear side behind the rear-side focal point of the projection lens, and formed as a line light source extending in an axial direction of a light source bulb;

a reflector for reflecting light from the light source forward and closer to the optical axis, wherein the light source is fixedly inserted into the reflector from the lateral side of the optical axis;

a shade, disposed so that the upper end edge of the shade is positioned close to the optical axis in the vicinity of the rear-side focal point, for partially shielding the light reflected from the reflector;

a first additional reflector, disposed between the light source bulb and the shade, for reflecting light from the light source to an area in front in the direction of inserting the light source bulb on the reflective surface of the reflector; and a second additional reflector, formed on the area in front in the direction of inserting the light source bulb, for reflecting the light reflected from the first additional reflector forward and closer to the optical axis;

wherein a configuration of the reflective surface of the first additional reflector is in an ellipsoidal shape with the position of the light source as a first focal point and a predetermined position between the first additional reflector and the second additional reflector as a second focal point.

* * * * *